A. H. HANDLAN, Jr.
HOSE COUPLING.
APPLICATION FILED OCT. 16, 1919.
1,427,105. Patented Aug. 29, 1922.
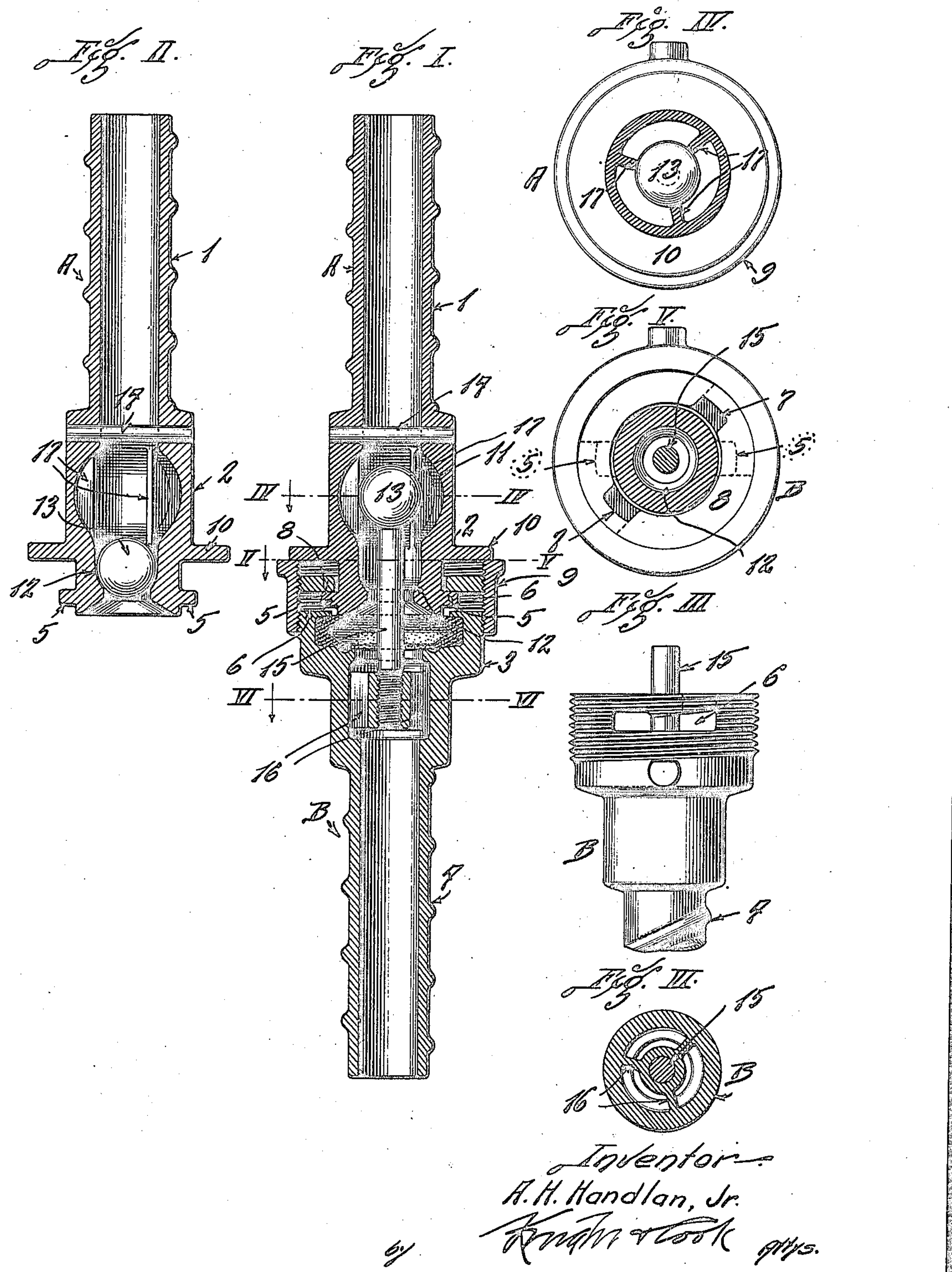

UNITED STATES PATENT OFFICE.

ALEXANDER H. HANDLAN, JR., OF ST. LOUIS, MISSOURI.

HOSE COUPLING.

1,427,105. Specification of Letters Patent. Patented Aug. 29, 1922.

Application filed October 16, 1919. Serial No. 331,238.

*To all whom it may concern:*

Be it known that I, ALEXANDER H. HANDLAN, Jr., a citizen of the United States, a resident of St. Louis, in the State of Missouri, have invented certain new and useful Improvements in Hose Couplings, of which the following is a full, clear, and exact description, reference being had to the accompanying drawings, forming a part of this specification.

My invention relates to a hose or pipe coupling for use in conducting air or other fluids, and it has for its object, to provide, in a coupling of this kind, means whereby a ball valve in one section of the coupling is caused to follow a direct course toward a valve seat intended to receive it, thereby causing the valve to seat properly, in each closing action, thus avoiding indirect impact against the valve seat, tending to wear the seat unevenly and in time so impair the valve seat as to result in leakage of fluid between the valve and its seat.

Fig. I is a longitudinal section through a hose coupling constructed in accordance with my invention, the ball valve and the valve unseating plunger being shown in elevation.

Fig. II is a longitudinal section through the primary section of my hose coupling with the ball valve in elevation shown resting against the valve seat.

Fig. III is a side elevation of the head of the secondary section of my coupling.

Figs. IV, V and VI are, respectively, cross sections taken on lines IV—IV, V—V, and VI—VI, Fig. I.

In the drawings, A designates the primary section and B the secondary section of my hose coupling.

The primary section A of my coupling comprises a neck 1 to which a hose or pipe may be fitted and a head 2 for connection to the secondary section B. The secondary section comprises a head 3 and a neck 4 to the latter of which a hose or pipe may be fitted. The heads of the two sections A and B may be joined in any manner usual to hose couplings as for example by providing the primary section with lugs 5 for interlocking engagement with the head of the secondary section of the coupling by entrance into slots 6 in said head which communicate with openings 7 in an end web 8. The interlocking engagements of the sections thus attained is retained by a ring 9 having screw threaded engagement with one of the sections and bearing against a flange 10 on the other section when the coupling sections are joined. The means for connecting the coupling sections is old and no invention is herein claimed for such means.

The primary section of my coupling contains a valve pocket 11 in communication with the passageway through the section and at the forward end of said pocket is a valve seat chamber containing a valve seat 12. 13 is a ball valve movable from the pocket 11 to the valve seat 12, which valve when resting against said valve seat serves to prevent flow of fluid from the primary section A to the secondary section B of my coupling. The ball valve 13 is retained in the pocket and the valve seat chamber extending therefrom by a cross pin 14 extending transversely across the forward end of the neck 1, adjacent to the rear end of the valve pocket.

15 designates a valve unseating plunger mounted in the secondary section of my coupling in a spider 16 or other suitable support, said stem being of sufficient length to extend into the valve seat chamber of the primary section to move the valve 13 away from the valve seat 12 when the two sections A and B of the model are joined to each other. Therefore, when the sections are joined the valve 13 is held unseated and fluid, under pressure, may flow through the primary section past the valve therein and into and through the secondary section.

It is frequently desirable in the use of a coupling such as my invention relates to to uncouple the sections without discontinuing the flow of fluid pressure into the primary section A. In the coupling herein described the uncoupling of the section results in the withdrawal of the valve unseating plunger 15 from the primary section and the force of the fluid pressure acts to move the valve against the valve seat 12, thereby closing the primary section of the coupling and keeping it closed until the sections are again joined with the result of causing the valve to be unseated through the medium of the plunger 15.

Couplings of the kind herein described as heretofore made have contained valve pockets in communication with valve seat chambers and have also included valve unseating plungers but the valve pockets have been merely chambers of sufficient dimensions to permit the flow of fluid between the valves and the walls of said chambers without any provision for directing the valves in an undeviating course toward the valve seats with which they are intended to contact. Consequently the valves when unseated lie in offset positions relative to an axial line through the coupling and the pressure of fluid thereagainst, in acting against the valve, drives it forwardly toward the valve seat in such a course as to cause the valve to strike the valve seat at an angle instead of in a straight line, and the force of impact of the valve so directed is sufficient to, in time, wear the valve seat unevenly, eventually causing leakage to occur between the valve and the valve seat. To overcome the uneven wearing of the valve seat, and consequent uneven wearing of the valve, I provide in the valve receiving pocket 11, guides 17 preferably in the form of ribs extending longitudinally of the coupling and the inner edges of which are spaced apart a sufficient degree to permit the travel of the ball valve 13 between them. The edges of these guides terminate at the chamber containing the valve seat 12, and are preferably flush with the wall of said chamber and in continuation thereof, hence the valve in its movements travels directly to and from the valve seat 12 and when it moves into contact with said valve seat, strikes the seat without any uneven wearing action such as has been possible in the absence of valve guiding means as contemplated by my improvement.

I claim:

A coupling of the character described comprising a section having a valve pocket therein and a valve seat adjoining said pocket, a ball valve in said pocket, the portion of said pocket adjoining said valve seat being relatively small and approximately equal in diameter to the ball valve, said pocket having an enlarged portion permitting flow of fluid around the valve when the latter occupies its open position, guiding ribs in said enlarged portion having their edges flush with the wall of the relatively small portion of the pocket and in continuation thereof, said relatively small portion of the pocket and said guiding ribs forming an elongated guideway for guiding said ball valve in a straight line to and from the valve seat, and a section engageable with the first mentioned section and having a projecting valve-unseating plunger whereby said ball valve is displaced from said relatively small portion of the pocket and held at the guiding ribs in said enlarged portion.

In testimony that I claim the foregoing I hereunto affix my signature.

ALEXANDER H. HANDLAN, Jr.